(12) United States Patent
Chiba et al.

(10) Patent No.: US 11,472,090 B2
(45) Date of Patent: Oct. 18, 2022

(54) PREFORM AND BOTTLE

(71) Applicants: Junichi Chiba, Tokyo (JP); Hiroshi Hosokoshiyama, Tokyo (JP)

(72) Inventors: Junichi Chiba, Tokyo (JP); Hiroshi Hosokoshiyama, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 946 days.

(21) Appl. No.: 16/250,226

(22) Filed: Jan. 17, 2019

(65) Prior Publication Data

US 2019/0143576 A1 May 16, 2019

Related U.S. Application Data

(63) Continuation of application No. 15/324,234, filed as application No. PCT/JP2015/003967 on Aug. 6, 2015, now abandoned.

(30) Foreign Application Priority Data

Aug. 28, 2014 (JP) .................................. 2014-174354

(51) Int. Cl.
*B29C 49/06* (2006.01)
*B29C 49/08* (2006.01)
(Continued)

(52) U.S. Cl.
CPC .............. *B29C 49/06* (2013.01); *B29B 11/08* (2013.01); *B29B 11/14* (2013.01); *B29C 49/08* (2013.01); *B29C 49/22* (2013.01); *B65D 1/02* (2013.01); *B65D 1/0215* (2013.01); *B29C 45/16* (2013.01); *B29C 49/0005* (2013.01); *B29C 2049/222* (2013.01); *B29C 2949/072* (2022.05); *B29C 2949/0733* (2022.05); *B29C 2949/0872* (2022.05); *B29C 2949/22* (2022.05);
(Continued)

(58) Field of Classification Search
CPC ......... B29C 49/06; B29C 49/08; B29C 49/22; B29C 49/0005; B29C 45/16; B29B 11/08; B29B 11/14; B65D 1/02; B65D 1/0215
USPC ............... 215/12.1; 220/62.22, 62.12, 62.11; 264/537, 532
See application file for complete search history.

(56) References Cited

U.S. PATENT DOCUMENTS

| | | | |
|---|---|---|---|
| 2002/0058114 A1* | 5/2002 | Sung | ....................... B32B 7/023 425/525 |
| 2010/0028577 A1 | 2/2010 | Siegl | |
| 2014/0076837 A1 | 3/2014 | Abe et al. | |

FOREIGN PATENT DOCUMENTS

| | | |
|---|---|---|
| CN | 101733859 A | 6/2010 |
| EP | 1 034 910 A1 | 9/2000 |

(Continued)

OTHER PUBLICATIONS

Nov. 30, 2018 Office Action issued in Chinese Patent Application No. 201580038248.X.
(Continued)

*Primary Examiner* — Robert J Hicks
(74) *Attorney, Agent, or Firm* — Oliff PLC (57) ABSTRACT

Provided is a method for manufacturing a preform (1). The method includes injecting into a cavity of a mold through the gate: (i) a first colored resin (R1) for a first predetermined time period, and (ii) a second colored resin (R2), having a color different from that of the first colored resin, for a second predetermined time period.

4 Claims, 6 Drawing Sheets

(51) Int. Cl.
    *B29C 49/22*    (2006.01)
    *B65D 1/02*    (2006.01)
    *B29B 11/14*    (2006.01)
    *B29B 11/08*    (2006.01)
    *B29C 45/16*    (2006.01)
    *B29K 105/00*    (2006.01)
    *B29C 49/00*    (2006.01)
    *B29K 23/00*    (2006.01)
    *B29K 67/00*    (2006.01)
    *B29L 31/00*    (2006.01)

(52) U.S. Cl.
CPC ...... *B29C 2949/28* (2022.05); *B29C 2949/30* (2022.05); *B29C 2949/3016* (2022.05); *B29C 2949/3032* (2022.05); *B29C 2949/3034* (2022.05); *B29C 2949/3036* (2022.05); *B29C 2949/3038* (2022.05); *B29K 2023/12* (2013.01); *B29K 2067/003* (2013.01); *B29K 2105/0032* (2013.01); *B29K 2105/0094* (2013.01); *B29K 2105/258* (2013.01); *B29K 2995/002* (2013.01); *B29K 2995/0018* (2013.01); *B29K 2995/0021* (2013.01); *B29L 2031/7158* (2013.01)

(56) References Cited

FOREIGN PATENT DOCUMENTS

| | | | | |
|---|---|---|---|---|
| EP | 1559530 A1 * | 8/2005 | ......... | B29C 45/1684 |
| JP | H01-146707 A | 6/1989 | | |
| JP | 2000-141571 A | 5/2000 | | |
| JP | 2000-254963 A | 9/2000 | | |
| JP | 2006-334849 A | 12/2006 | | |
| JP | 2011-526546 A | 10/2011 | | |
| WO | 2006/118067 A1 | 11/2006 | | |
| WO | WO-2006118067 A1 * | 11/2006 | ............. | B29B 11/08 |

OTHER PUBLICATIONS

Jun. 5, 2019 Office Action issued in Chinese Application No. 201580038248.X.
Oct. 13, 2015 International Search Report issued in International Patent Application No. PCT/JP2015/003967.
Feb. 28, 2017 International Preliminary Report on Patentability issued in International Patent Application No. PCT/JP2015/003967.
Jan. 9, 2018 Office Action issued in Japanese Patent Application No. 2014-174354.
Jan. 19, 2018 Extended Search Report issued in European Patent Application No. 15835621.2.
Mar. 27, 2018 Office Action issued in Chinese Patent Application No. 201580038248.X.
May 15, 2018 Office Action issued in Japanese Patent Application No. 2014-174354.
Jul. 31, 2018 Office Action issued in Japanese Patent Application No. 2014-174354.
Oct. 17, 2018 Office Action issued in U.S. Appl. No. 15/324,234.

* cited by examiner

PREFORM AND BOTTLE

CROSS-REFERENCE TO RELATED APPLICATIONS

This is a Continuation of application Ser. No. 15/324,234 filed Jan. 5, 2017, which in turn is a national stage entry of PCT/JP2015/003967 filed Aug. 6, 2015, which claims priority to JP 2014-174354 filed Aug. 28, 2014. The disclosure of each of the prior applications is hereby incorporated by reference herein in its entirety.

TECHNICAL FIELD

The present disclosure relates to a synthetic resin preform including a colored layer, which forms a gradation region in which a layer thickness gradually decreases, and to a bottle obtained by biaxially stretch blow molding such a preform. In detail, the present disclosure is to achieve a favorable gradation pattern.

BACKGROUND

Regarding bottles that are made of synthetic resin, such as polyethylene terephthalate (PET), and that are used in various fields, such as beverages, foods, and cosmetics, such a bottle is known to be biaxially stretch blow molded and decorated with gradations associated with color density. The gradations may be caused to appear by changing the color density in the upward and the downward direction (i.e., a direction extending along the axis of the bottle). (Refer to, for example, Patent Literature 1.) In Patent Literature 1, a gradation pattern is obtained by disposing an intermediate layer, made of colored resin, in between transparent base material layers by co-injection molding using a three-layer nozzle.

CITATION LIST

Patent Literature

PTL 1: JP2006334849A

SUMMARY

Technical Problem

However, a conventional bottle as described in Patent Literature 1 poses the problem that the gradation pattern cannot be emphasized due to colorless transparency of the base material layers. Although one possible way to address this is to add a coloring agent to the base material, this also faces the problem that the intermediate layer is hidden, thereby making the gradation pattern invisible.

The present disclosure has been developed in view of the aforementioned current situation, and the present disclosure is to provide a preform and a bottle by which a favorable gradation pattern is achieved.

Solution to Problem

Summary and features of the present disclosure are as follows.
1. A synthetic resin preform including a colored layer forming a gradation region in which a layer thickness gradually decreases, wherein,
on an outer circumferential side of a base material layer made of a first colored resin, the colored layer, which is made of a second colored resin having a color different from that of the first colored resin and which forms the gradation region in which the layer thickness gradually decreases upward, is formed, and, on the outer circumferential side of the colored layer, a coating layer made of the first colored resin is formed.
2. The preform according to the above item 1, wherein the preform is molded, from a state where the first colored resin is filled in a gate disposed in correspondence with a middle of a bottom of the preform, by injecting the first colored resin into a cavity of a mold through the gate for a first predetermined time period and by injecting the second colored resin material for a second predetermined time period, and
by setting a starting time point of the first predetermined time period to be behind a starting time point of the second predetermined time period, setting a finishing time point of the first predetermined time period to be behind a finishing time period of the second predetermined time period, and setting an injection rate of the second colored resin to be faster than an injection rate of the first colored resin, the first colored resin is caused to flow while stretching the second color resin after penetrating a center portion of the second colored resin located inside the cavity of the mold, and
the colored layer is formed on the outer circumferential side of the base material layer, and the coating layer is formed on the outer circumferential side of the colored layer.
3. The preform according to the above item 1 or 2, wherein the first colored resin has an IV in the range from 0.5 to 0.63.
4. A bottle obtained by biaxially stretch blow molding the preform according to any one of the items 1 to 3 and decorated with gradations associated with color density that are caused to appear by the colored layer.

Advantageous Effects

According to the present disclosure, since the colored layer made of the second colored resin, which has a color different from that of the first colored resin, is formed on the outer circumferential side of the base material layer made of the first colored resin, the gradation pattern is emphasized. Furthermore, since the coating layer made of the first colored resin is formed on the outer circumferential side of the colored layer, transition in density of the gradation pattern is obscured with the thin coating layer covering the colored layer. Thus, a favorable gradation pattern is achieved.

Accordingly, the present disclosure provides a preform and a bottle by which the favorable gradation pattern is achieved.

DETAILED DESCRIPTION

The following describes a preform 1 and a bottle 8 according to one of embodiments of the present disclosure in more detail by way of illustration with reference to FIGS. 1 to 4.

Herein, the upward and the downward direction refers to a direction extending along the axis of the preform 1. The term upward refers to a direction extending from a bottom 2 to a mouth 4 of the preform 1, and the term downward refers to a direction opposite thereto.

Figure 1:
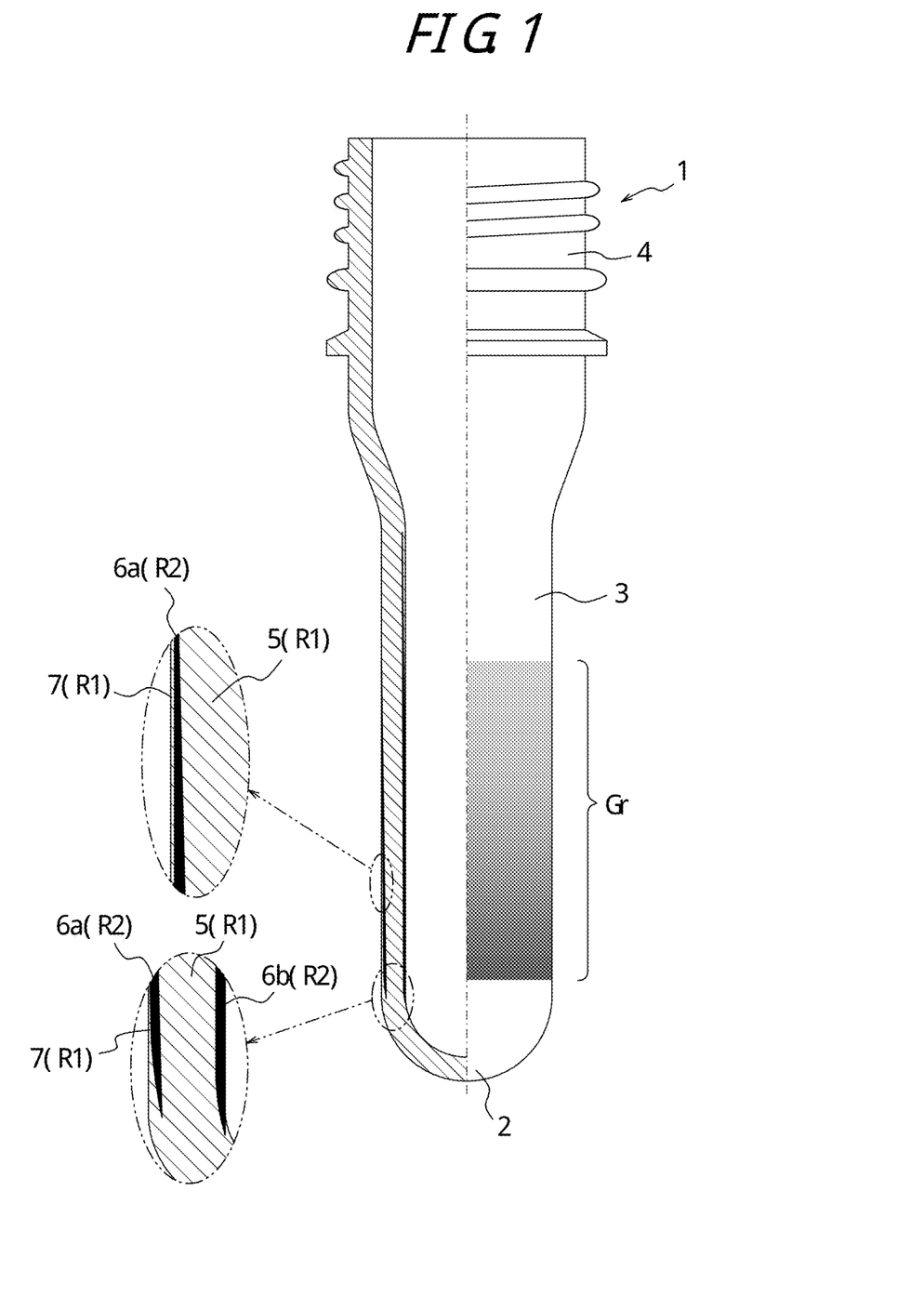
FIG. 1 is a partial sectional side view, with some portions thereof enlarged, of a preform according to one of embodiments of the present disclosure.

As illustrated in FIG. 1, the synthetic resin preform 1 according to the present embodiment has a bottomed cylindrical shape including the bottom 2, a trunk 3, and the mouth 4, and the preform 1 has been molded by co-injecting two types of colored resin. In detail, the preform 1 includes a base material layer 5, which is made of a first colored resin R1 (preferably, PET in which a white coloring agent is added). On the outer circumferential side of the base material layer 5, there is also formed an outer colored layer 6a, which is made of a second colored resin R2 (preferably, PET in which a coloring agent in any color other than white is added) having a color different form that of the first colored resin R1 and which forms a gradation region Gr in which a layer thickness gradually decreases upward. Furthermore, a coating layer 7, which is made of the first colored resin R1, is formed on the outer circumferential side of the outer colored layer 6a.

Moreover, an inner colored layer 6b, which is made of the second colored resin R2, is formed on the inner circumferential side of the base material layer 5. Thus, the preform 1 has, in the gradation region Gr, a four-layer structure including the coating layer 7 (the first colored resin R1)/the outer colored layer 6a (the second colored resin R2)/the base material layer 5 (the first colored resin R1)/the inner colored resin 6b (the second colored resin R2) from the outer circumferential side to the inner circumferential side. Additionally, the preform 1 according to the present embodiment is used to obtain a beverage bottle having a weight of 22 g and may be biaxially stretch blow molded to form a bottle of, for example, 266 ml, 542 ml, or 579 ml.

Figure 2:
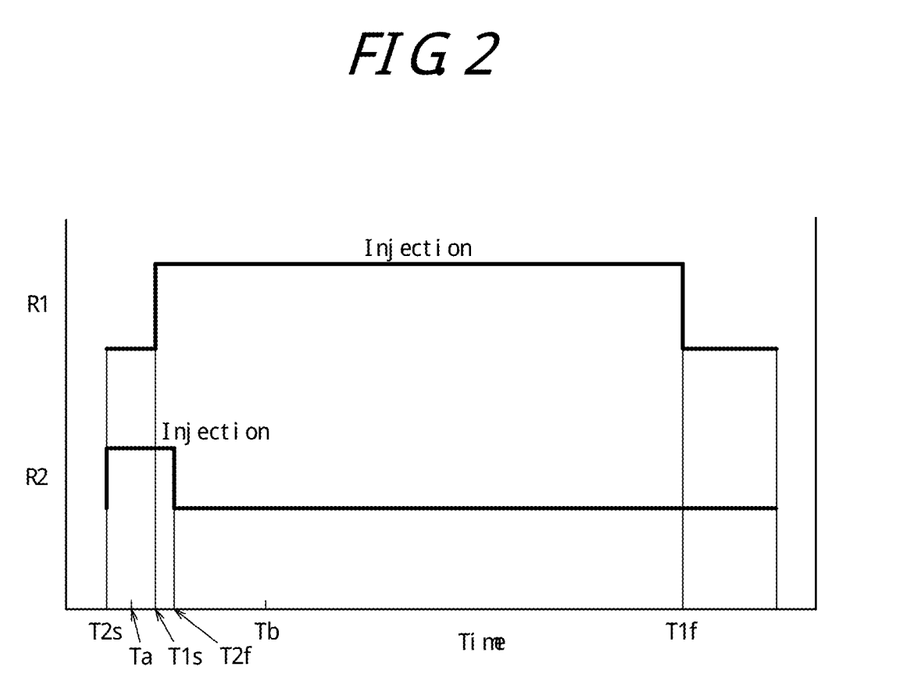
FIG. 2 illustrates an example of an injection pattern used to mold a preform illustrated in FIG. 1.

The preform 1 with the above configuration may be produced according to the following outline. That is to say, the preform 1 is molded, from the state where the first colored resin R1 is filled in a gate disposed in correspondence with the middle of a bottom 2 of the preform 1, by injecting the first colored resin R1 into a cavity of a mold through the gate for a first predetermined time period and by injecting the second colored resin material R2 for a second predetermined time period, with use of a two-layer gate nozzle. For instance, as illustrated in FIG. 2, a starting time point T1s of the first predetermined time period is behind a starting time point T2s of the second predetermined time period, and a finishing time point T1f of the first predetermined time period is behind a finishing time point T2f of the second predetermined time period. Furthermore, an injection rate of the second colored resin R2 is faster than an injection rate of the first colored resin R1.

Herein, the first predetermined time period may be 7 seconds, the second predetermined time period may be 0.68 second, and a delay time period of the starting time point T1s of the first predetermined time period with respect to the starting time point T2s of the second predetermined time period may be 0.1 second. The injection rate of the second colored resin R2 may be 80 mm/s, and the injection rate of the first colored resin R1 may be 6 mm/s.

Figure 3A:
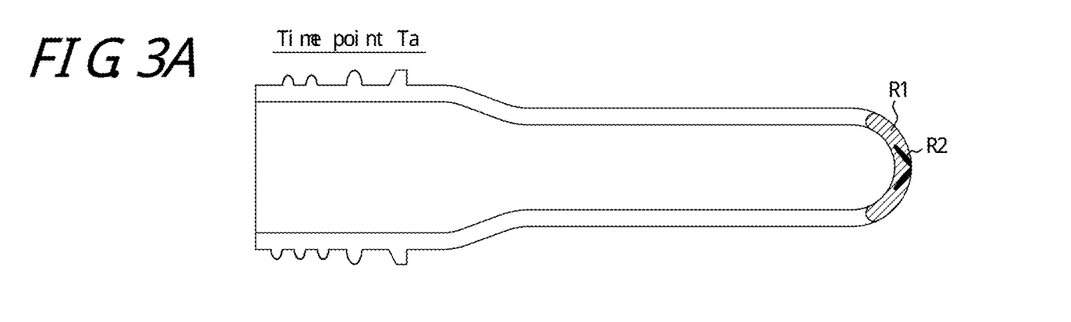
FIGS. 3A to 3D illustrate the process of filling molten resin into a cavity of a mold according to an injection pattern illustrated in FIG. 2.
Figure 3B:
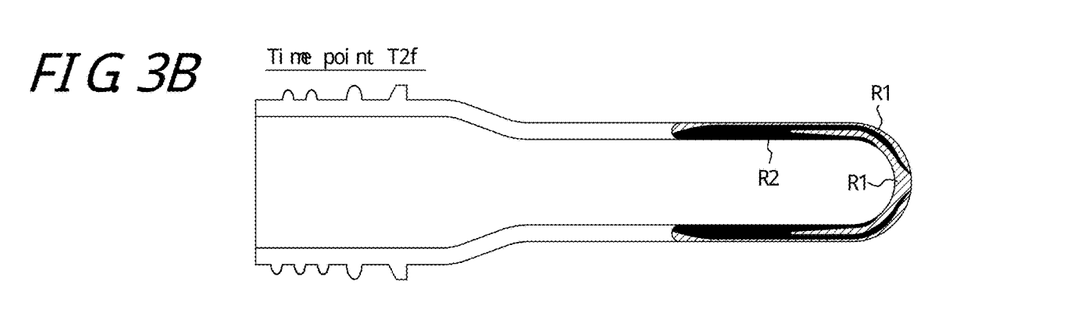
Figure 3C:
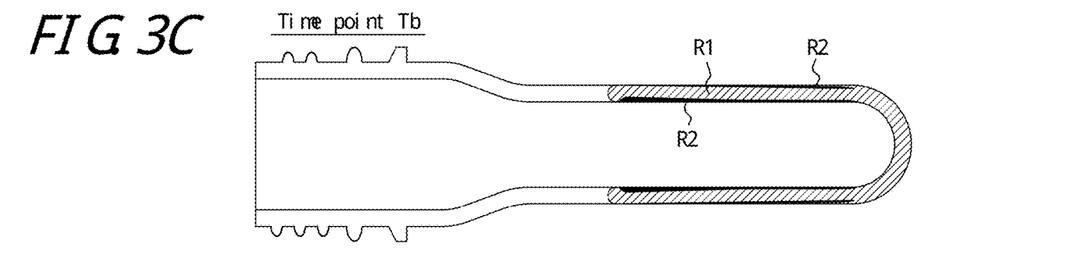
Figure 3D:
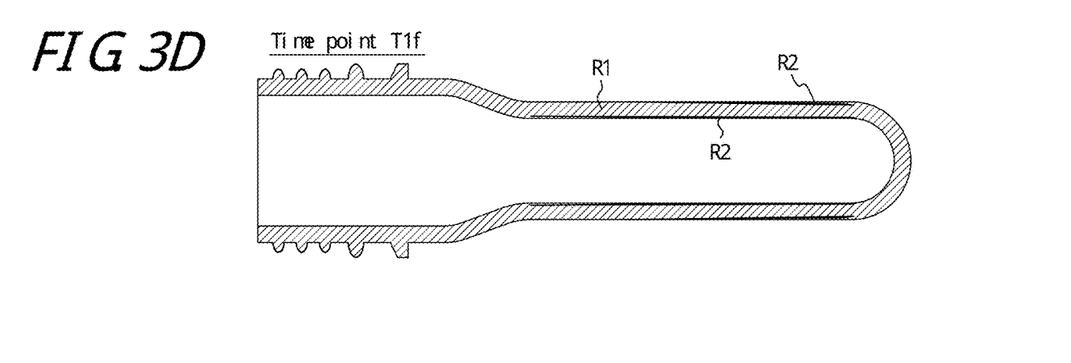

By co-injection molding the first colored resin R1 and the second colored resin R2 at the injection timing and injection rates as described above, the resins R1 and R2 are flown as illustrated in FIGS. 3A to 3D, and thus, the preform 1 is obtained. That is to say, as illustrated in FIG. 3A, at a time point Ta, which is behind the start of the injection of the second colored resin R2 from the state where the first colored resin R1 is filled in the gate and ahead of the start of the injection of the first colored resin R1, the second colored resin R2 flows inside the cavity of the mold while extruding the first colored resin R1 filled in the gate. Then, at a time point T2f, when the injection of the second colored resin R2 is finished, as illustrated in FIG. 3B, the second colored resin R2 penetrates a center portion of the first colored resin R1, with a region on an outer circumferential surface of the cavity that corresponds to the gradation region Gr being coated with the first colored resin R1. Furthermore, at a time point Tb, as illustrated in FIG. 3C, the first colored resin R1 penetrates a center portion of the colored resin R2 and flows while stretching the second colored resin R2. At a time point T1f, when the injection of the first colored resin R1 is finished, as illustrated in FIG. 3D, the aforementioned layer structure of the preform 1 is achieved.

Figure 4:
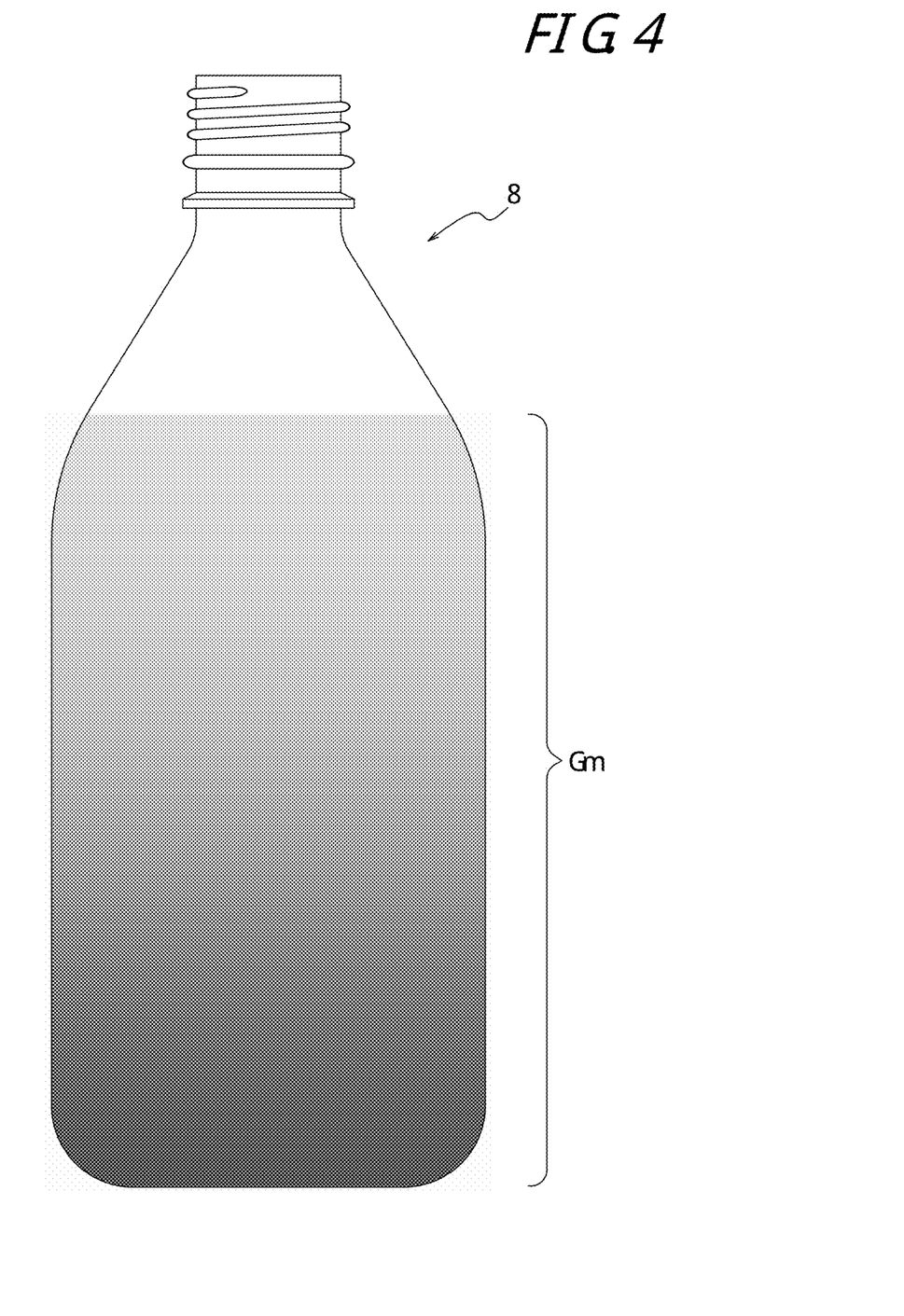
FIG. 4 is a side view of a bottle obtained by biaxially stretch blow molding a preform illustrated in FIG. 1.

According to the preform 1 of the present embodiment described above, the bottle 8, which is decorated with gradations associated with color density that are caused to appear by the outer colored layer 6a as illustrated in FIG. 4, is obtained by biaxially stretch blow molding the preform 1. According to the bottle 8 of the present embodiment, since the outer colored layer 6a, which is made of the second colored resin R2 having a color different from that of the first colored resin R1, is formed on the outer circumferential side of the base material layer 5, which is made of the first colored resin R1, a gradation pattern Gm is emphasized. Furthermore, since the coating layer 7, which is made of the first colored resin R1, is formed on the outer circumferential side of the outer colored layer 6a, transition in density of the gradation pattern Gm is obscured with the thin coating layer 7 covering the outer colored layer 6a. Thus, the favorable gradation pattern Gm is achieved.

Additionally, to achieve the favorable gradation pattern Gm, an intrinsic viscosity (IV) of the first colored resin R1 is preferably in the range from 0.5 to 0.63 and more preferably in the range from 0.6 to 0.63.

Figure 5:
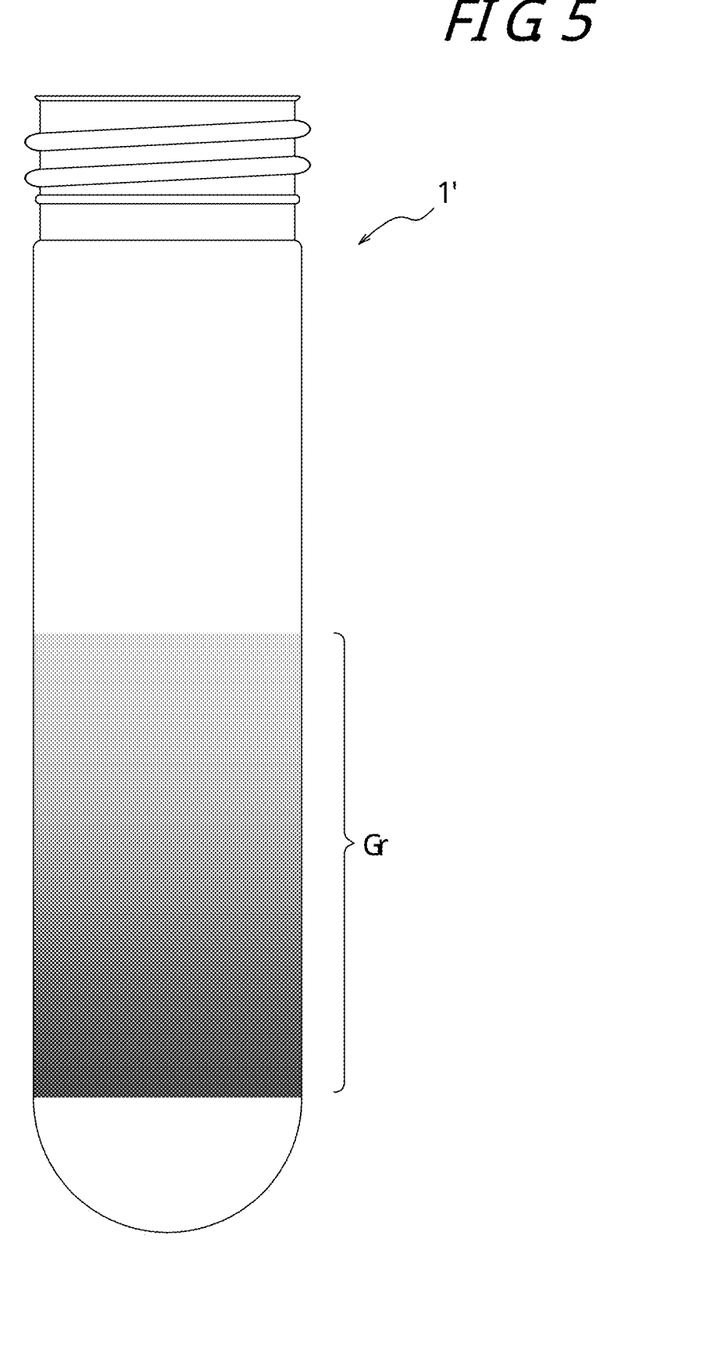
FIG. 5 is a side view of a modification of a preform according to one of embodiments of the present disclosure.
Figure 6:
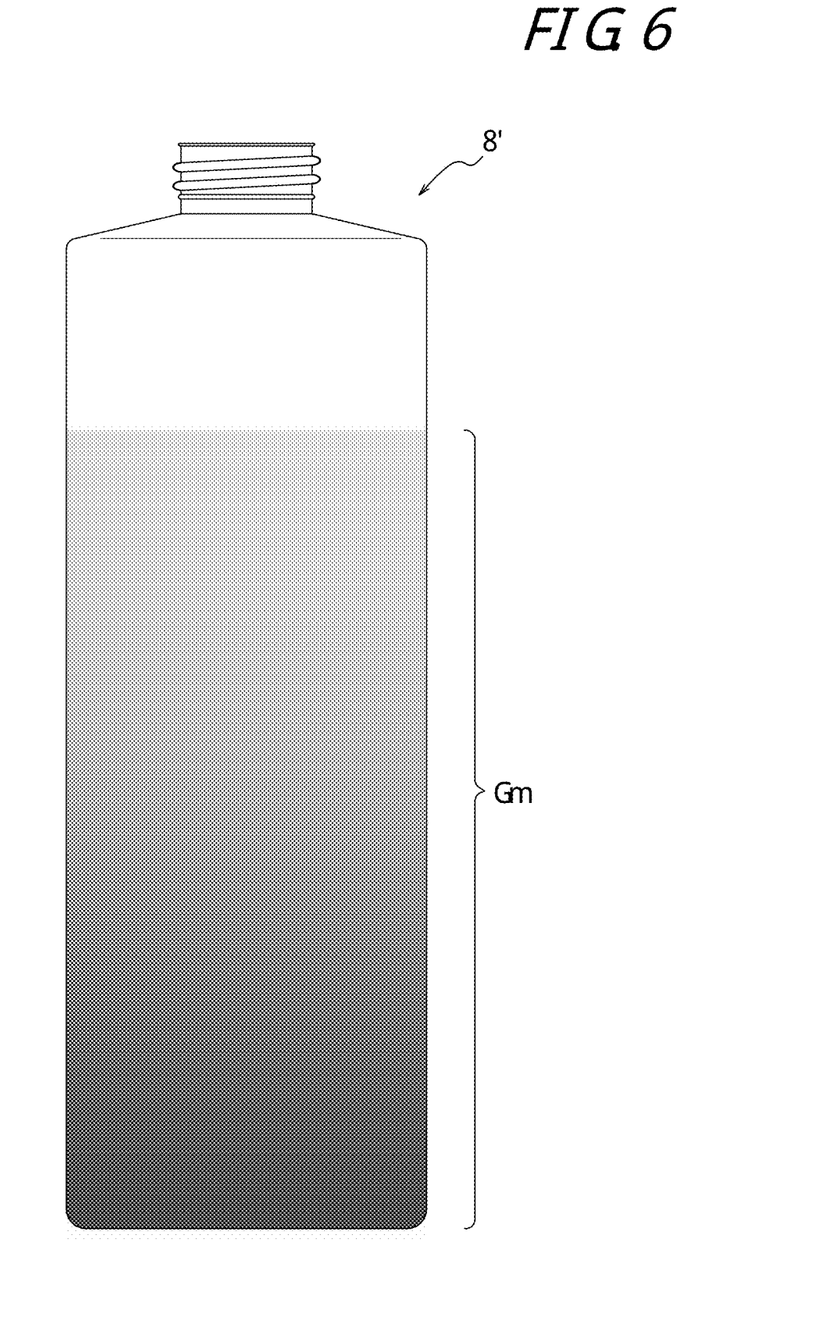
FIG. 6 is a side view of a bottle obtained by biaxially stretch blow molding a preform illustrated in FIG. 5.

Although the preform 1 and the bottle 8 according to the embodiment has been described to be used in beverage application, as a modification, those used in toiletry application as illustrated in FIGS. 5 and 6 may also be considered. A bottle 8' according to the present modification is obtained, for example, by biaxially stretch blow molding a preform 1' having a weight of 50 g, and the bottle 8' has a capacity of, for example, 550 ml. In this case also, similarly to the above embodiment, the favorable gradation pattern Gm is achieved.

The description above is considered to be merely illustrative of one of embodiments of the present disclosure, and various changes may be made within the scope of the claims. For example, one or both of the first colored resin R1 and the second colored resin R2 may be polypropylene (PP) instead of PET. Furthermore, the first colored resin R1 and the second colored resin R2 does not need to be colorless and transparent and may be colored and transparent depending on purposes.

REFERENCE SIGNS LIST 1, 1' Preform
2 Bottom
3 Trunk
4 Mouth
5 Base material layer
6a Outer colored layer (colored layer)
6b Inner colored layer
7 Coating layer
8, 8' Bottle
R1 First colored resin
R2 Second colored resin
Gr Gradation region
T1s Starting time point of first predetermined time period
T2s Starting time point of second predetermined time period
T1f Finishing time point of first predetermined time period
T2f Finishing time point of second predetermined time period
Ta, Tb Time point
Gm Gradation pattern

The invention claimed is:

1. A method for manufacturing a synthetic resin preform, the preform comprising: (i) a base material layer made of a first colored resin, (ii) a colored layer that is made of a second colored resin having a color different from that of the first colored resin and forms a gradation region on an outer circumferential side of the base material layer, wherein a layer thickness of the gradation region gradually decreases upward, and (iii) a coating layer, made of the first colored resin, on an outer circumferential side of the colored layer, the method comprising:

filling the first colored resin in a gate disposed in correspondence with a middle of a bottom of the preform,
injecting into a cavity of a mold through the gate: (i) the first colored resin for a first predetermined time period, and (ii) the second colored resin material, having a color different from that of the first colored resin, for a second predetermined time period, wherein:
(i) a starting time point of the first predetermined time period is set to be between a starting time point of the second predetermined time period and a finishing time point of the second predetermined time period,
(ii) a finishing time point of the first predetermined time period is set to be after the finishing time point of the second predetermined time period, and
(iii) an injection rate of the second colored resin is set to be faster than an injection rate of the first colored resin, so that:
(i) the second colored resin penetrates a center portion of the first colored resin under a state in which a region on an outer circumferential surface of the cavity is coated with the first colored resin, where the region corresponds to the gradation region, and then
(ii) the first colored resin penetrates a center portion of the second colored resin located inside the cavity of the mold, such that the first colored resin is caused to flow while stretching the second color resin, so as to form: (a) the colored layer on the outer circumferential side of the base material layer, and (b) the coating layer on the outer circumferential side of the colored layer.

2. The method for manufacturing the preform according to claim 1, wherein the first colored resin has an IV in the range from 0.5 to 0.63.

3. A method for manufacturing a bottle, comprising:
biaxially stretch blow molding the preform manufactured by the method according to claim 1, and
decorating with gradations associated with color density that are caused to appear by the colored layer.

4. A method for manufacturing a bottle, comprising:
biaxially stretch blow molding the preform manufactured by the method according to claim 2, and
decorating with gradations associated with color density that are caused to appear by the colored layer.

* * * * *